US006817475B2

(12) United States Patent
Jacobson et al.

(10) Patent No.: US 6,817,475 B2
(45) Date of Patent: Nov. 16, 2004

(54) MULTI-STAGE FILTER CLEANING SYSTEM WITH WATER RECYCLING

(75) Inventors: Jon D. Jacobson, Farmington, NM (US); Paul M. Jacobson, Rio Rancho, NM (US)

(73) Assignee: Filter Service Corp., Farmington, NM (US)

( * ) Notice: Subject to any disclaimer, the term of this patent is extended or adjusted under 35 U.S.C. 154(b) by 0 days.

(21) Appl. No.: 10/208,909

(22) Filed: Jul. 29, 2002

(65) Prior Publication Data

US 2004/0016707 A1 Jan. 29, 2004

(51) Int. Cl.[7] .............................................. B01D 35/16
(52) U.S. Cl. ....................... 210/409; 210/791; 210/797; 134/10; 134/50; 134/56 R; 134/84; 134/88; 134/103.2; 134/135; 134/137
(58) Field of Search .......................... 134/44, 50, 56 R, 134/61, 84, 88, 91, 94.1, 98.1, 103.1, 103.2, 135, 137; 210/409, 791, 797

(56) References Cited

U.S. PATENT DOCUMENTS

| | | | | |
|---|---|---|---|---|
| 5,361,790 A | * | 11/1994 | Park et al. | .................. 134/95.3 |
| 5,707,457 A | * | 1/1998 | Yates | ........................... 134/30 |
| 6,394,113 B1 | * | 5/2002 | Hatanaka et al. | ........... 134/184 |

* cited by examiner

Primary Examiner—Robert James Popovics
(74) Attorney, Agent, or Firm—Maxwell C. Freudenberg; Kenton L. Freudenberg

(57) ABSTRACT

A system for liquid cleaning a plurality of dirty open-ended cylindrical internal combustion engine paper air filters by subjecting each filter to a cleaning cycle including successive first, intermediate and final cleaning steps. For each step liquid is pumped from a separate tank to spray heads for rinsing a filter at a cleaning station and effluent with entrained contaminants is collected for transfer away from the cleaning station. First step cleaning pumps an unclean liquid previously collected in a first tank as effluent from the intermediate step of a preceding filter cleaning cycle and first step effluent is disposed of away from the system. Intermediate step cleaning pumps a semi-clean liquid previously collected in a second tank as effluent from the final cleaning step of a preceding filter cleaning cycle and intermediate step effluent is collected and transferred as unclean liquid to the first tank for cleaning use during the first stage of the succeeding filter cleaning cycle. Final stage cleaning pumps a fresh liquid from a third tank which is continuously filled from a fresh liquid source during the filter cleaning cycle. Filters are rotated on inclined supports at the cleaning station and sprayed cleaning liquid may be selectively directed to clean filter surfaces by spray nozzles at the inside and outside of the rotating filter. A collector is located below the cleaning station to collect all effluent during each cleaning step.

8 Claims, 4 Drawing Sheets

MULTI-STAGE FILTER CLEANING SYSTEM WITH WATER RECYCLING

The present invention relates to a system for liquid cleaning a plurality of dirty cylindrical paper air filters by subjecting each filter to a cleaning cycle including successive first, intermediate and final cleaning steps, each step using cleaning liquid from a different source.

BACKGROUND OF THE INVENTION

In prior art systems filter cleaning has been accomplished by recycling a continuous flow of a clean water with resulting effluent becoming increasingly contaminated over a period of time.

Prior art filter cleaners have used compressed air as well as continuous streams of fresh cleaning liquid or have continuously recycled a stream of cleaning liquid from a large reservoir usually provided with sufficient volume to enable settling of particles from the liquid after it rinses a filter. Maintenance and cleaning of such a large settling system is both labor intensive as well as requiring a large area for installation. Such a large system poses additional problems as to portability.

Prior art filter cleaning systems have used relatively high-volume water passed continuously over and through the filter media in order to remove the particulate matter which is built up on the filter surfaces and which may have become caked in place. The initial removal is primarily a mechanical function in which the flow water is used to dislodge the cake and accordingly the water which is used for this purpose need not be free of particulate matter prior to its coming into contact with the particular filter to be cleaned.

SUMMARY ON OF THE INVENTION

The present invention utilizes for each of the cleaning steps in a filter cleaning cycle, except for a last fresh water cleaning rinse step, water which has been saved as the partially contaminated effluent of a "cleaner" or later step in the sequential steps of a preceding filter cleaning cycle. By recycling the water accordingly the present system reduces the amount of stored water in the system and because of the reduction in size of the required storage tanks the system can be made relatively portable, as by mounting on a truck.

Moreover the present system can be directly connected to a domestic water system for obtaining fresh water as well as for discharge of non-hazardous effluent from the system to a domestic sewer system.

The present system enables high volume flow rates for each step of the cleaning cycle even when a domestic water source can provide only a substantially lower rate of input to the system.

Control components for three pumps, a filter rotating motor and several valves to sequentially operate the steps, or timed portions of steps, of each filter cleaning cycle and selectively control the spraying of different outside and inside filter surfaces are relatively simple and easily configured for either manual or completely automatic time controlled sequenced operation of all components upon mere initiation of a cycle by the user after loading the cleaning station with one or more coaxially arranged filters to be cleaned.

Although the prior art rotated cylindrical filters about their axes with the axes inclined during filter cleaning operations, the prior art has not recognized or suggested the improvement achieved by the present invention in sequencing several distinct spraying steps in a single cleaning cycle and availing of the use of inclination of the filter axis to facilitate flowing and collecting all of the different mixtures of cleaning liquid and entrained contaminants as effluents during each of the steps of the cleaning cycle. Inclined rotational support for the filters is achieved in a manner well known in the art by using motor-driven parallel rollers engaging the outer cylindrical surface of each filter and includes conventional shoulders engaged by the lower end of the roller to prevent axial movement of the filter during cleaning.

Nozzles are positioned to direct selected flows of cleaning liquid to the interior and exterior surfaces of the filter cartridge. The nozzle locations are such as to avoid interference with loading and unloading filters being cleaned at the cleaning station Typically a dirty filter has a "clean" side and a "dirty" side. It is desirable to avoid introducing any contaminants to the clean side and therefore an initial application of contaminated liquid is used only on the "dirty" side and serves the function of knocking the accumulated dust cake from the dirty filter surface.

In the present system the initial cleaning cycle step using application of water primarily to dislodge the accumulated "dust cake" from the surface of the filter obtains the water from a storage tank of used or unclean water collected during an earlier intermediate step of the preceding filter cleaning cycle, whereas subsequent cleaning steps in one cleaning cycle are effected using progressively cleaner cleaning liquids.

In the preferred embodiment the entire cleaning cycle comprise three stages or steps and for each stage a separate reservoir is provided. A "clean" tank is filled with clean water such as that derived from a domestic water source. The clean tank provides water for the final cleaning stage during which the effluent is captured for retention, filtered, and sent to a "filtered tank". The effluent of the final rinse step is relatively uncontaminated and can be filtered using a simple auxiliary string wound cartridge filter without posing any significant problem of clogging of the filter.

While it would be possible in to eliminate the clean tank and provide a source of water directly from the domestic source for the last cleaning stage, typically the flow rates available from the domestic source are not sufficient to match the flow rates desirable for the present invention. Accordingly by providing a reservoir for storage of the clean water the inflow of domestic water can be maintained into the reservoir through the entire cycle and during idle periods at the cleaning station even though the higher flow rate from the clean tank only occurs during, for example, one-third of the cleaning cycle. In this manner even though the instantaneous incoming flow rate of clean water from a domestic system may be inadequate for efficient cleaning of the object to be cleaned, the overall flow rate over time is sufficient to meet the needs of the present device.

The flow of cleaning liquid during each step of the cleaning cycle is maintained by a pump which for example provides a flow of approximately 50 gallons per minute. Using a system of storage reservoirs and manually or automatically controllable valves, water is circulated in a sequence which provides progressively cleaner water for the cleaning process.

The process runs relatively continuously and provides little time for settling of the many suspended particulates in any one of the reservoirs. The reservoir for the first stage accumulates the dirtiest water and a centrifugal separator and drain means are provided at the bottom of the reservoir to allow removal of any accumulated sediments. Each of the other tanks need only be provided with a means for draining contaminants from the bottom of the tank.

The greatest benefits of the present invention are achieved by removal and disposal of a relatively high percentage of the particulates in the initial step of the filter cleaning cycle.

The present system uses a multi-stage cycle for cleaning a filter at a cleaning station with each successive stage using a cleaning liquid which is cleaner than that used in the preceding stage. A supply reservoir for each stage obtains its cleaning liquid either from a fresh cleaning liquid source or from effluent of a respective later stage of a preceding operating cycle at the cleaning station.

Each cleaning cycle takes about three minutes followed by an idle period of the cleaning station of not more than three minutes for servicing and reloading the cleaning station with dirty filters to be cleaned. Thus a total time of perhaps six minutes is available for supplying an input storage reservoir with clean cleaning liquid at a rate which is substantially lower than the rate of flow of the cleaning liquid during each cleaning cycle stage which may be as high as 50 gallons per minute.

The reservoir containing the dirtiest cleaning liquid after the first stage of the cleaning cycle may be equipped with a centrifugal separator for solid particles at the bottom of the reservoir to separate and remove some of the contaminate particles before the cleaning liquid of this reservoir is used in a succeeding cleaning cycle. An outlet at the bottom of this reservoir with suitable manually or automatically controlled valve means and pump facilitates removal of such separated material to an appropriate disposal site.

The present invention recognizes the utility of saving dirty water from an earlier cleaning cycle for such initial cleaning and using cleaner water for the ensuing steps particle removal. Such reuse of cleaning liquid minimizes the amount of liquid stored in the system for a cycle of operation to clean a filter at the cleaning station. Thus the system may be readily portable and is suitable for direct connection to a domestic water system both for obtaining fresh cleaning liquid as well as for disposing of dirty cleaning liquid via the sewer line of the domestic water system. The present system enables high volume flow rates of the cleaning liquid during each step of the cleaning cycle notwithstanding only low volume capability of the domestic water supply.

Among the objects of the invention is to provide a multistage liquid cleaning system for filters which can use large volumes of cleaning liquid and still be portable by truck in a usable configuration.

Another object of the invention is to provide a liquid cleaning system which can be connected to a domestic system for supply of fresh water and for disposal of waste effluent to a domestic sewer line.

A further object of the invention is to achieve high volume liquid flow rates in a liquid cleaning system which substantially exceed the liquid flow rates available from a source of fresh liquid such as a domestic water system.

Another object of the invention is to enable recycling of cleaning liquid to different stages of cleaning in successive filter cleaning cycles.

Another object of the invention is to provide a multi-stage cleaning system in which each successive stage of cleaning of a filter uses a progressively cleaner cleaning liquid.

Another object of the invention is to provide a multi-stage cleaning system in which each successive stage of cleaning of a filter except the last uses a recycled partially contaminated liquid collected during a stage of a preceding cleaning cycle Another object of the invention is to enable partial removal of contaminant particles from a filter cleaning effluent before using this effluent for further filter cleaning in a succeeding cleaning cycle.

A further object of the invention is to reduce the time required for liquid cleaning of filters by improved control of sequential filter cleaning steps in a multi-step process using different recycles liquids.

DESCRIPTION OF THE PREFERRED EMBODIMENT

While the present system is particularly suited to the cleaning of filters using water as the cleaning fluid, it is to be understood that the term "filter" as used herein may refer to any item which lends itself to cleaning by the application of a fluid stream, and that any cleaning fluid which may be supplied as described herein may be substituted for water.

Figure 1:
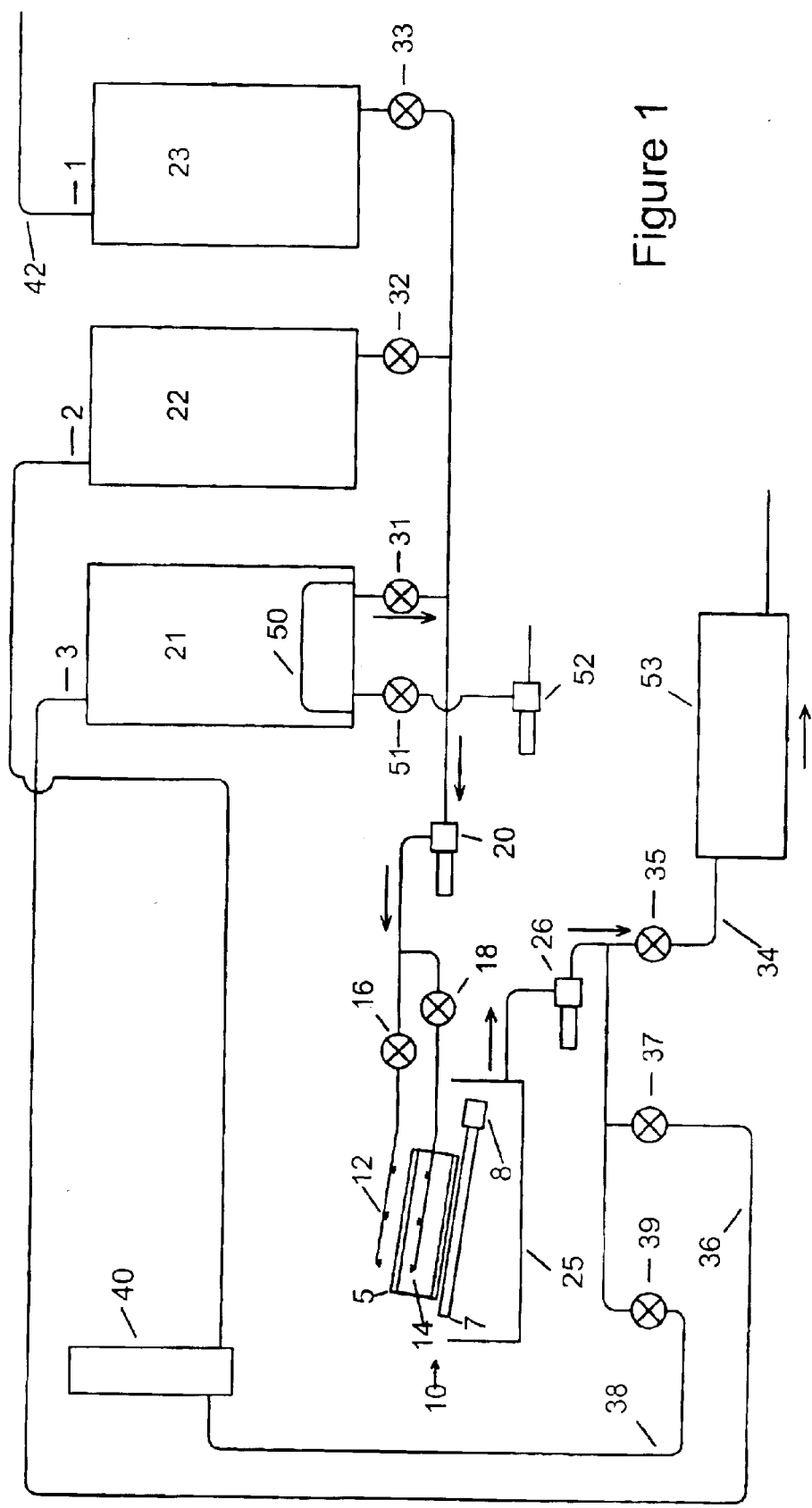
FIG. 1 is a schematic diagram of a cleaning system with the cleaning liquid flow path for a first step of a cleaning cycle shown by heavier lines.
Figure 2:
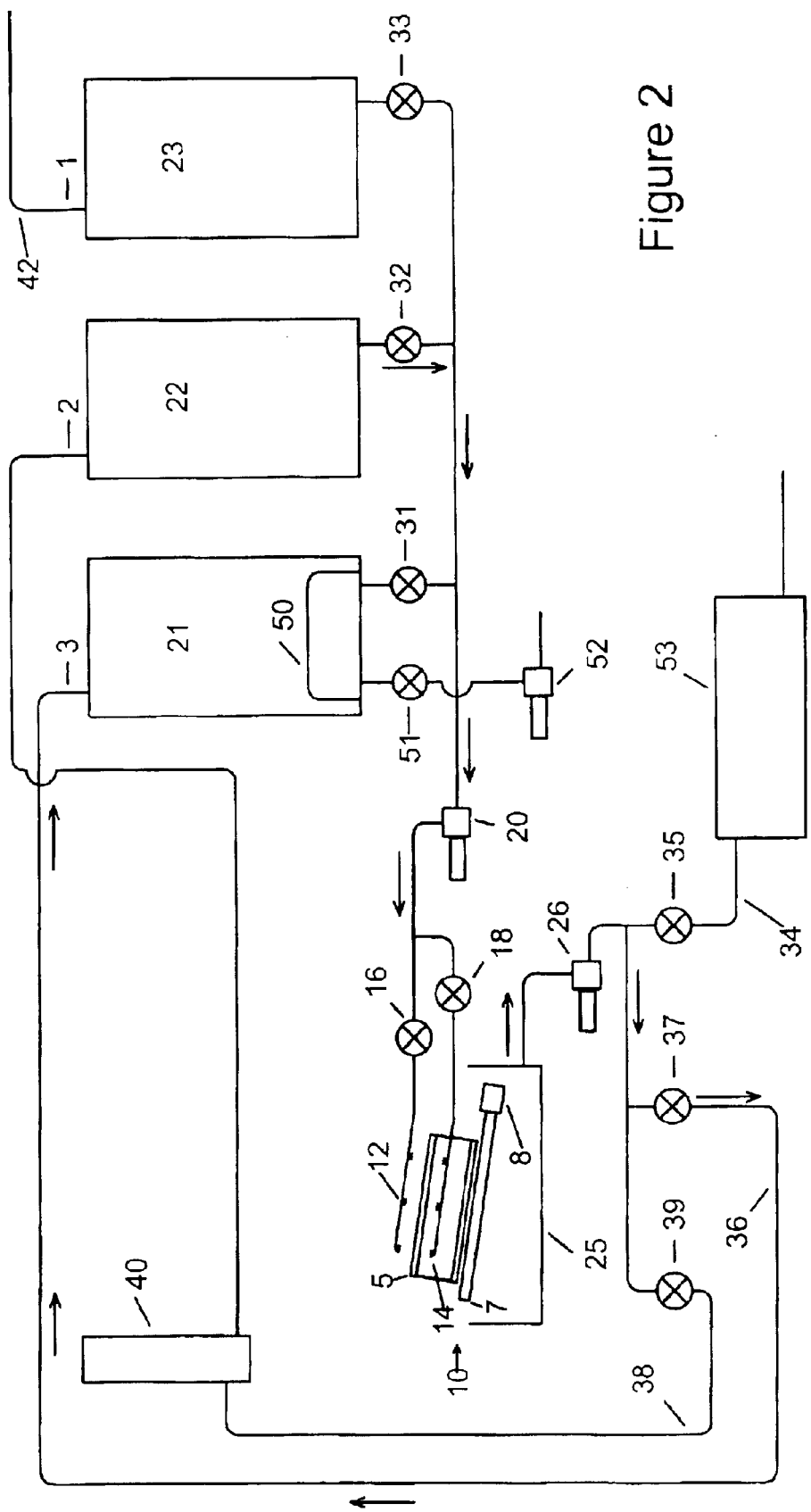
FIG. 2 is a schematic diagram of a cleaning system with the cleaning liquid flow path for an intermediate step of a cleaning cycle shown by heavier lines.
Figure 3:
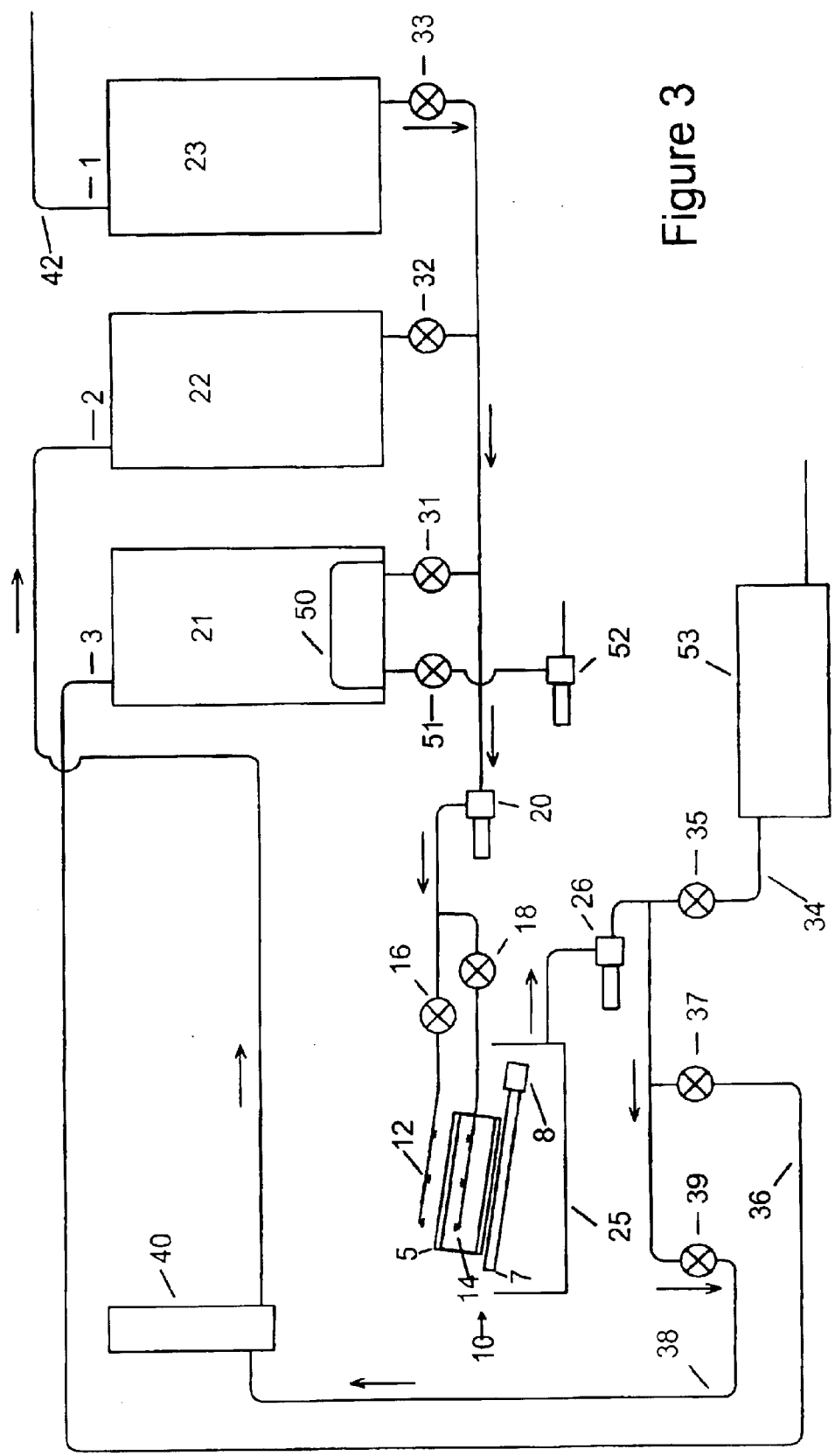
FIG. 3 is a schematic diagram of a cleaning system with the cleaning liquid flow path for a final step of a cleaning cycle shown by heavier lines.
Figure 4:
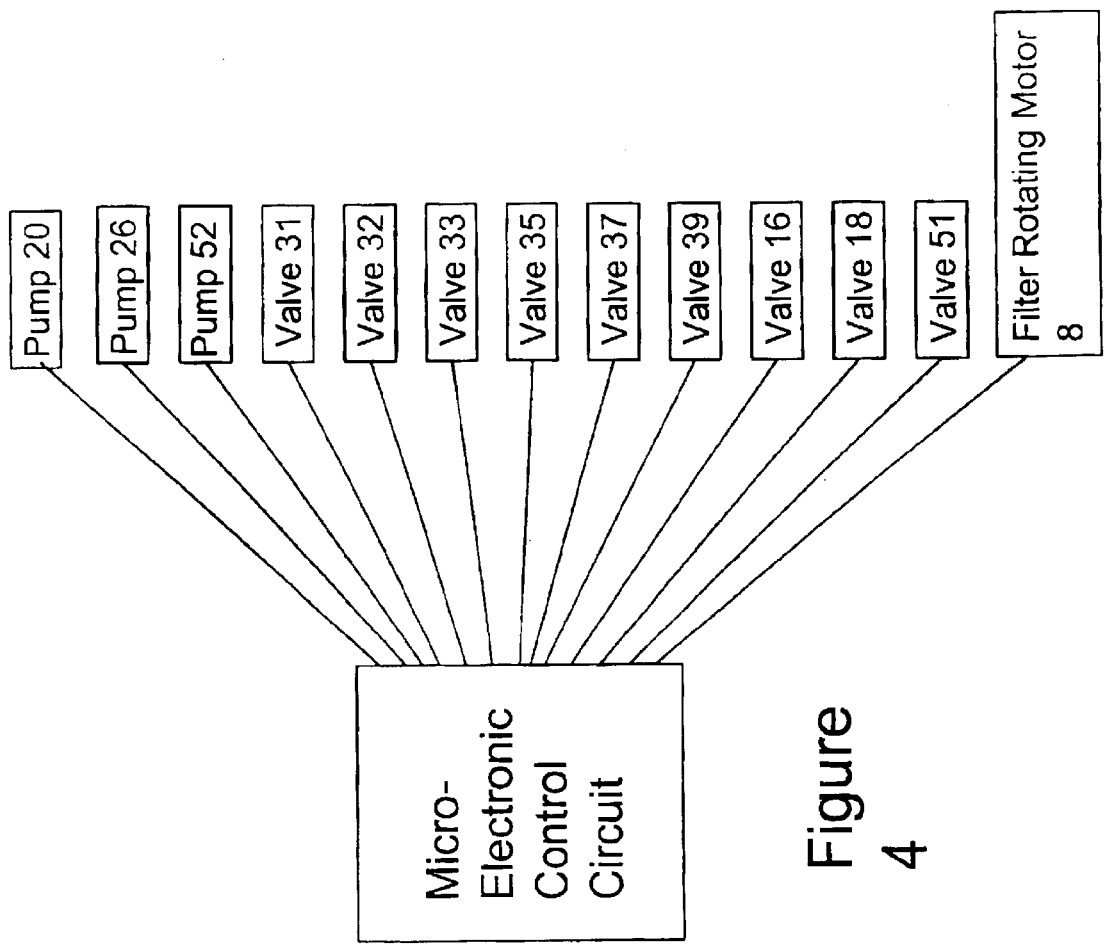
FIG. 4 is a schematic diagram for a control system for the pumps, motors and valves of the cleaning system.

FIGS. 1–3 show a system for cleaning one or more open-ended coaxially arranged cylindrical filters 5 concurrently rotatably supported and driven by a roller support 7 having a driving motor 8 at a filter cleaning station 10. At this cleaning station 10 the cleaning system includes a cleaning liquid spray nozzle assembly comprising multiple external spray heads 12 for externally spraying each filter and multiple internal spray heads 14 for internally spraying each filter to rinse dirt from filter surfaces. The cleaning system is provided with an automatically controlled microelectronic programming means to enable the nozzle assembly spray heads 12 and 14, under control of their respective valves 16 and 18, to operate through one cleaning cycle to selectively supply to each filter being cleaned a filter cleaning liquid drawn selectively by means of a pump 20 from three different reservoir sources 21, 22 and 23 during three respective sequential filter cleaning stages of the cleaning cycle. For convenience these reservoirs may be called dirty liquid reservoir 21, filtered liquid reservoir 22 and clean liquid reservoir 23. For each stage the effluent and entrapped dirt from the cleaning station 10 is captured by a collector tank 25 and fed to a pump 26 to provide a means for transferring all the collected effluent away from the cleaning station 10. The cycle of three stages of filter cleaning is repeated for each placement of one or more filters to be cleaned at the filter cleaning station 10.

Referring to FIG. 1, during the first stage of filter rinsing, semi-contaminated liquid from reservoir tank 21 flows through its control valve 31 and pump 20 to the cleaning station. 10. The collected effluent from this first stage is most heavily contaminated with a majority of the dirt particles from the filter being cleaned and is discharged to an appropriate sewer or other disposal line 34 by opening valve 35. The disposal line may include a sand trap 53 in series to entrap some of the dirt particles for separately removing them and preventing them from entering the sewer line. The reservoir 21 is essentially emptied during the first stage of each filter rinsing. The cleaning liquid flow path or circuit for the first stage of filter rinsing is provided by means of tank 21, control valve 31, pump 20, valves 16 and 18, spray heads 12 and 14, over the filter element at the cleaning 10 and through the effluent collector tank 25 from where the cleaning liquid with a first portion of entrained contaminants removed from the filter element is transferred by pump 26 through valve 35 and on to the sand trap 53 and sewer line 34 where it is disposed of. The sequencing controls for the valves 16 and 18 may be selectively operated to use only the outside spray heads 12 for part or all of the first stage spraying operation when caked particles are being removed from a filter.

Referring to FIG. 2, during the second stage of filter rinsing, moderately-filtered liquid from reservoir 22 flows through its control valve 32 and pump 20 to the cleaning station. 10. The collected effluent from this second stage is less contaminated with dirt particles from the filter being cleaned and is discharged to a transfer line 36 by opening valve 37. Transfer line 36 is connected to refill reservoir 21 for use of the collected effluent from this second stage in a succeeding cleaning cycle at cleaning station 10. The reservoir 22 is essentially emptied during the second stage of filter rinsing. The cleaning liquid flow path or circuit for the second or intermediate stage of filter rinsing is provided by means of tank 22, control valve 32, pump 20, valves 16 and 18, spray heads 12 and 14, over the filter element at the cleaning 10 and through the effluent collector tank 25 from where the cleaning liquid with a further portion of entrained contaminants removed from the filter element is transferred by pump 26 through valve 37 and on to refill tank 21 for use in a succeeding filter cleaning cycle.

Referring to FIG. 3, during the third or last stage of filter rinsing a fresh cleaning liquid from reservoir 23 is used. The fresh cleaning liquid from reservoir 23 flows through its control valve 33 and pump 20 to the cleaning station. 10. The collected effluent from this last stage is even less contaminated with dirt particles as the filter is cleaned to the last level of filter cleanliness and is discharged to a transfer line 38 by opening valve 39. Transfer line 38 is connected to an auxiliary filter 40 which is utilized to remove some of the contaminants from the last stage effluent before this last stage effluent is passed through line 41 which is connected to refill reservoir 22 for use of the collected effluent from this last stage in a succeeding cleaning cycle at cleaning station 10. The filter 39 is preferably selected to enable it to perform its additional filtering function throughout 15 to 20 cycles of operation of the cleaning station 10. The cleaning liquid flow path or circuit for the last or final stage of filter rinsing is provided by means of fresh cleaning liquid tank 23, control valve 33, pump 20, valves 16 and 18, spray heads 12 and 14, over the filter element at the cleaning 10 and through the effluent collector tank 25 from where the semi-clean cleaning liquid with entrained contaminants last removed from the filter element is transferred by pump 26 through valve 39, auxiliary filter 40 and on through line 41 to refill the tank 22 for use in a succeeding filter cleaning cycle.

During all stages of the cleaning cycle as well as during idle periods of the cleaning station 10 the filling of reservoir 23 from the fresh water line 42 may continue so that the rate of flow of cleaning liquid at station 10 effected by pump 20 during any or each of the stages of the cleaning cycle may be substantially greater than the inflow rate to reservoir 23 from the fresh cleaning liquid source 42. Accordingly the capacity of reservoir 23 will be appropriately larger than the capacity of either of the equally sized reservoirs 21 or 22. For example if the flow from pump 20 is 51 g.p.m. and the apparatus has a three minute cycle with one minute for each stage the reservoir 23 must have a capacity enabling 51 gallons of liquid to be drawn from this reservoir during the last stage of the cleaning cycle. For continuous operation of the cleaning station the average flow rate into reservoir 23 may be as low as 17 g.p.m. so that it will completely refill during each cycle. If the inflow rate of liquid from the clean liquid source is less than 17 g.p.m. a maximum rate of repetitive cycling of the station 10 with flow rates at the cleaning station of 51 g.p.m. may be achieved by increasing the capacity of the reservoir 23 to accommodate continuous filling of the reservoir 23 during all cycle stages and all idle periods of the cleaning station 10. Appropriate float control valves (not shown) prevent overfilling of reservoir 23.

Each of the different cleaning liquid circuits or flow paths for the three cleaning cycle stages described above utilize commonly shared pump 20, spray heads 12 and 14 with their respective control valves 16 and 18, the collecting tank 25 and the transfer pump 26.

The collecting tank 21 which supplies liquid for the first stage of cleaning contains the dirtiest liquid of all system tanks and may be provided with a centrifugal particle separator 50 connected through a valve 51 to a pump 52 for removal of separated contaminant particles. The outlet valve 512 and pump 52 may be used for emptying dirty liquid reservoir 21 at the end of a series of cleaning cycles to avoid lengthy storage periods of the dirtiest cleaning liquid and to facilitate cleaning of settled contaminants from the bottom of the reservoir.

The pressure applied to the cleaning liquid nozzles 14 and 16 may be adjusted by the control valves 16 and 18 and pump 20 to provide reduced pressure as the cleaning cycle progresses through the three stages of a cleaning cycle. As the cleanliness of a filter being cleaned improves during the sequential stages, less pressure is required for appropriate cleaning action of the cleaning liquid on the filter.

Other variations within the scope of this invention will be apparent from the described embodiment and it is intended that the present descriptions be illustrative of the inventive features encompassed by the appended claims.

What is claimed is:

1. A cleaning system for cleaning a plurality of dirty filters by subjecting each filter to a plurality of successive first, intermediate and last cleaning steps to be performed repeatedly in cleaning plural filters, a different circuit means being provided for each step including means for providing a controlled supply of sprayed cleaning liquid to a filter being cleaned, each circuit means comprising a tank for storing a cleaning liquid to be used in the respective cleaning step, spray apparatus for spraying a dirty filter to remove contaminant material from its filter surfaces, pump means for pumping cleaning liquid from the tank to the spray apparatus, collecting means associated with the spray apparatus to collect from a dirty filter a mixture of cleaning liquid and contaminant material removed from the dirty filter, and transfer means to remove said mixture from the respective circuit means, the circuit means for the last step including means for connecting its tank to a supply of clean cleaning liquid, the circuit means for the first step including means to connect its transfer means to dispose of the mixture therefrom outside of the system, and each other transfer means of a circuit means for other than the last step being connected to deliver the mixture therefrom to the tank of the circuit means for the preceding step, said different circuit means sharing a common spray apparatus atone cleaning station with the spray apparatus connected to supply a cleaning spray to only the outside of any filter at said station during the first cleaning step, said common spray apparatus including means for rotatably supporting at said station at least one cylindrical filter for rotation about a common cylindrical axis.

2. A cleaning system according to claim 1, wherein the tank for the last step circuit means is supplied with cleaning liquid from the clean cleaning liquid source sufficient for the first step of cleaning operation during periods of operation of the circuit means for all steps of system operation.

3. A cleaning system according to claim 2 wherein the pumping rate of each pump means is substantially higher than the rate at which cleaning liquid is supplied to the tank for the last step circuit means from the source of clean cleaning liquid.

4. A cleaning system according to claim 3 wherein the transfer means for the last step circuit means includes an auxiliary filter to remove contaminant material from the cleaning liquid passing to the tank of the intermediate step circuit means.

5. A cleaning system for cleaning a plurality of dirty filters by subjecting each filter to a plurality of successive first, intermediate and last cleaning steps to be performed repeatedly in cleaning plural filters, a different circuit means being provided for each step including means for providing a controlled supply of sprayed cleaning liquid to a filter being cleaned, each circuit means comprising a tank for storing a cleaning liquid to be used in the respective cleaning step, spray apparatus for spraying a dirty filter to remove contaminant material from its filter surfaces, pump means for pumping cleaning liquid from the tank to the spray apparatus, collecting means associated with the spray apparatus to collect from a dirty filter a mixture of cleaning liquid and contaminant material removed from the dirty filter, and transfer means including a separate pump means to remove said mixture from the respective circuit means, the circuit means for the last step including means for connecting its tank to a supply of clean cleaning liquid, the circuit means for the first step including means to connect it transfer means to dispose of the mixture therefrom outside of the system, and each other transfer means of a circuit means for other than the last step being connected to deliver the mixture therefrom to the tank of the circuit means for the proceeding step, said different circuit means sharing a common spray apparatus at one cleaning station with the spray apparatus connected to supply a cleaning spray to only the outside of any filter at said station during the first cleaning step, said common spray apparatus including means for rotatably supporting at said station at least one cylindrical filter for rotation about its cylindrical axis.

6. A cleaning system according to claim 5 wherein the tank for the last step circuit means is supplied with cleaning liquid from the clean liquid source sufficient for the first step of cleaning operation during periods of operation of the circuit means for all steps of system operation.

7. A cleaning system according to claim 6 wherein the pumping rate of each pump means is substantially higher than the rate at which cleaning liquid is supplied to the tank for the last step circuit means from the source of clean cleaning liquid.

8. A cleaning system according to claim 7 wherein the transfer means for the last step circuit means includes an auxiliary filter to remove contaminant material from the cleaning liquid being transferred to the tank of the intermediate step circuit means.

* * * * *